United States Patent
Jacobs et al.

[11] Patent Number: 5,690,374
[45] Date of Patent: Nov. 25, 1997

[54] SHOCK-ABSORBING TOOL HANDLE

[75] Inventors: Paul J. Jacobs, Arlington, Mass.; Ronald J. Shaud, Reading, Pa.

[73] Assignee: Nor-Easter Enterprises, Inc., Somerville, Mass.

[21] Appl. No.: 640,986

[22] Filed: Apr. 19, 1996

[51] Int. Cl.$^6$ .................. B25G 1/04; E01H 5/02
[52] U.S. Cl. ........................... 294/57; 294/54.5
[58] Field of Search ............... 294/19.1, 49, 54.5, 294/57–59; 15/144.4; 16/110 R, 110 RA, 114 R, 115; 81/177.2; 37/265, 278, 284, 285; 173/211; 267/71, 136, 137, 174; 403/229, 345

[56] References Cited

U.S. PATENT DOCUMENTS

| | | |
|---|---|---|
| 483,477 | 9/1892 | Ryan . |
| 1,294,304 | 2/1919 | Pittman . |
| 1,407,237 | 2/1922 | Thompson et al. . |
| 2,572,230 | 10/1951 | Williams ............................ 294/53.5 |
| 2,793,902 | 5/1957 | Govan, Jr. ............................ 294/57 |
| 2,943,711 | 7/1960 | Rossman ............................ 188/100 |
| 3,153,252 | 10/1964 | Ricciardi ............................ 15/143 |
| 3,227,497 | 1/1966 | Heckethorn ........................ 308/3.5 |
| 3,549,154 | 12/1970 | Jones .................................. 277/24 |
| 3,556,617 | 1/1971 | Axthammer et al. ............... 308/3.5 |
| 3,716,069 | 2/1973 | Reynolds ............................ 137/244 |
| 3,727,700 | 4/1973 | Arntsberg .......................... 173/18 |
| 3,803,988 | 4/1974 | Orr ..................................... 92/85 |
| 3,812,938 | 5/1974 | Fader et al. ........................ 188/322 |
| 3,866,923 | 2/1975 | Gorman ............................. 277/24 |
| 3,871,665 | 3/1975 | Burke et al. ....................... 277/24 |
| 3,889,958 | 6/1975 | Bennett ............................. 277/24 |
| 3,981,043 | 9/1976 | Curry ................................ 16/110 R |
| 3,993,340 | 11/1976 | Rusing et al. ..................... 294/53.5 |
| 4,039,197 | 8/1977 | Schmidt et al. .................... 277/24 |
| 4,067,584 | 1/1978 | Hunger ............................. 277/165 |
| 4,093,241 | 6/1978 | Muntjanoff et al. ............... 277/24 |
| 4,095,470 | 6/1978 | Sliger ............................... 73/368 |
| 4,249,561 | 2/1981 | Marttinen ......................... 137/244 |
| 4,461,486 | 7/1984 | Tregonning ....................... 277/24 |
| 4,466,377 | 8/1984 | Kolb et al. ........................ 16/114 R |
| 4,470,440 | 9/1984 | Thor ................................ 144/193 C |
| 4,484,754 | 11/1984 | Ballard ............................ 277/53 |
| 4,576,383 | 3/1986 | Ballard ............................ 277/53 |
| 4,577,363 | 3/1986 | Wyse ............................... 15/256.5 |
| 4,615,553 | 10/1986 | Hultine ............................ 294/58 |
| 4,621,386 | 11/1986 | Hill ................................. 15/104.01 R |
| 4,691,954 | 9/1987 | Shaud .............................. 294/54.5 |
| 4,841,597 | 6/1989 | Kolonia ........................... 16/114 R |
| 4,948,188 | 8/1990 | Haslam ............................ 294/54.5 |
| 5,209,534 | 5/1993 | Crenshaw et al. ............... 294/50.6 |
| 5,253,877 | 10/1993 | DeBiasse et al. ................ 277/24 |
| 5,263,404 | 11/1993 | Gaucher et al. ................. 92/168 |
| 5,415,448 | 5/1995 | Keathley ......................... 294/57 |
| 5,447,349 | 9/1995 | Coble ............................. 294/58 |
| 5,476,269 | 12/1995 | Karlsson ......................... 277/24 |

*Primary Examiner*—Johnny D. Cherry
*Attorney, Agent, or Firm*—Hamilton, Brook, Smith & Reynolds, P.C.

[57] ABSTRACT

A shock-absorbing telescoping tool handle is disclosed having tubular, larger diameter proximal and a smaller diameter distal portions. An internal spring between the handle portions is compressed when the handle portions telescope toward each other. Guide mechanism in the handle portions limits the extent of sliding motion between the handle portions and prevents relative rotation of the handle portions. One or more wipers in the handle portion wipes away any snow, water or debris on the distal portion which could potentially enter the spring area.

12 Claims, 2 Drawing Sheets

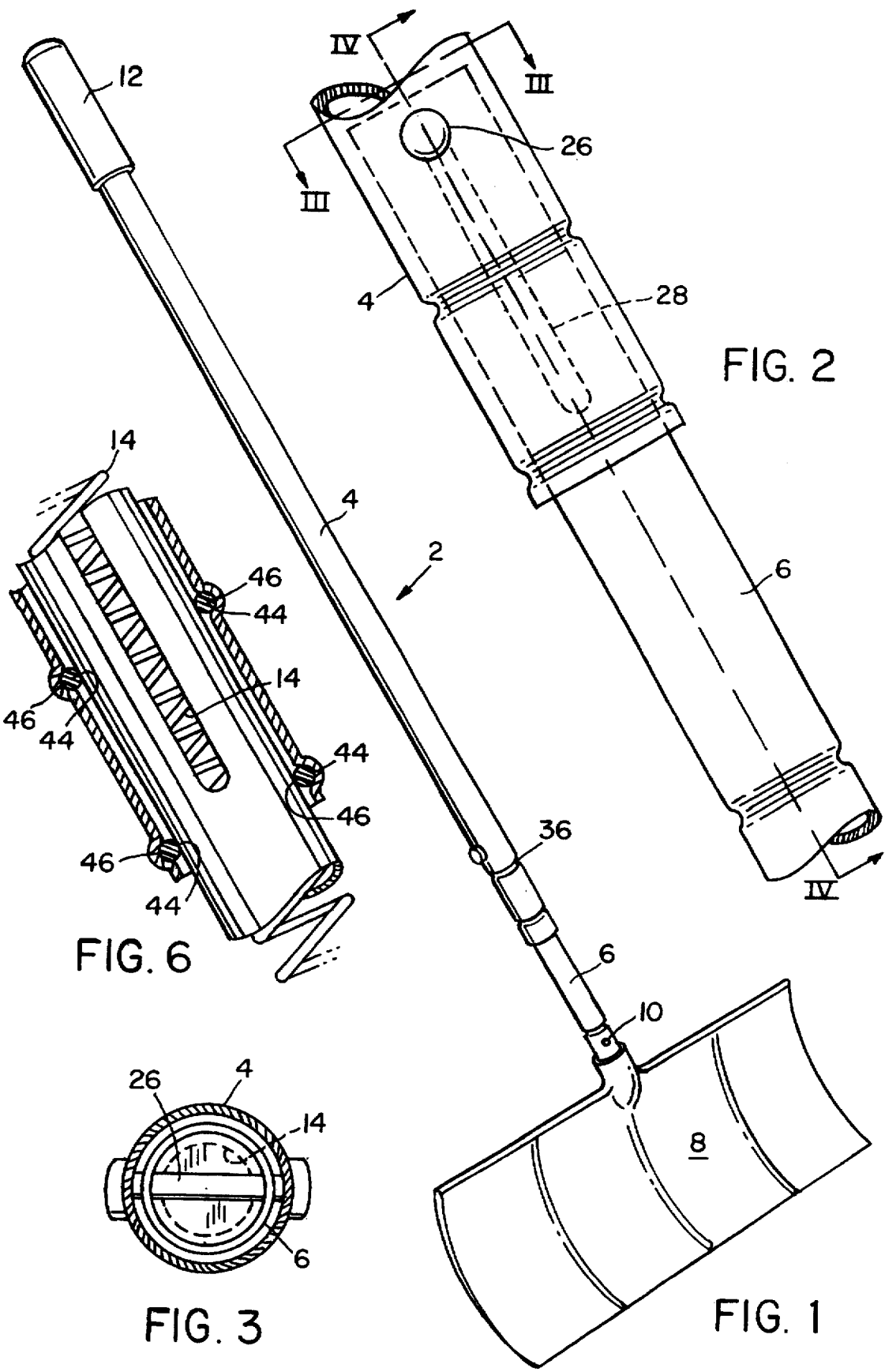

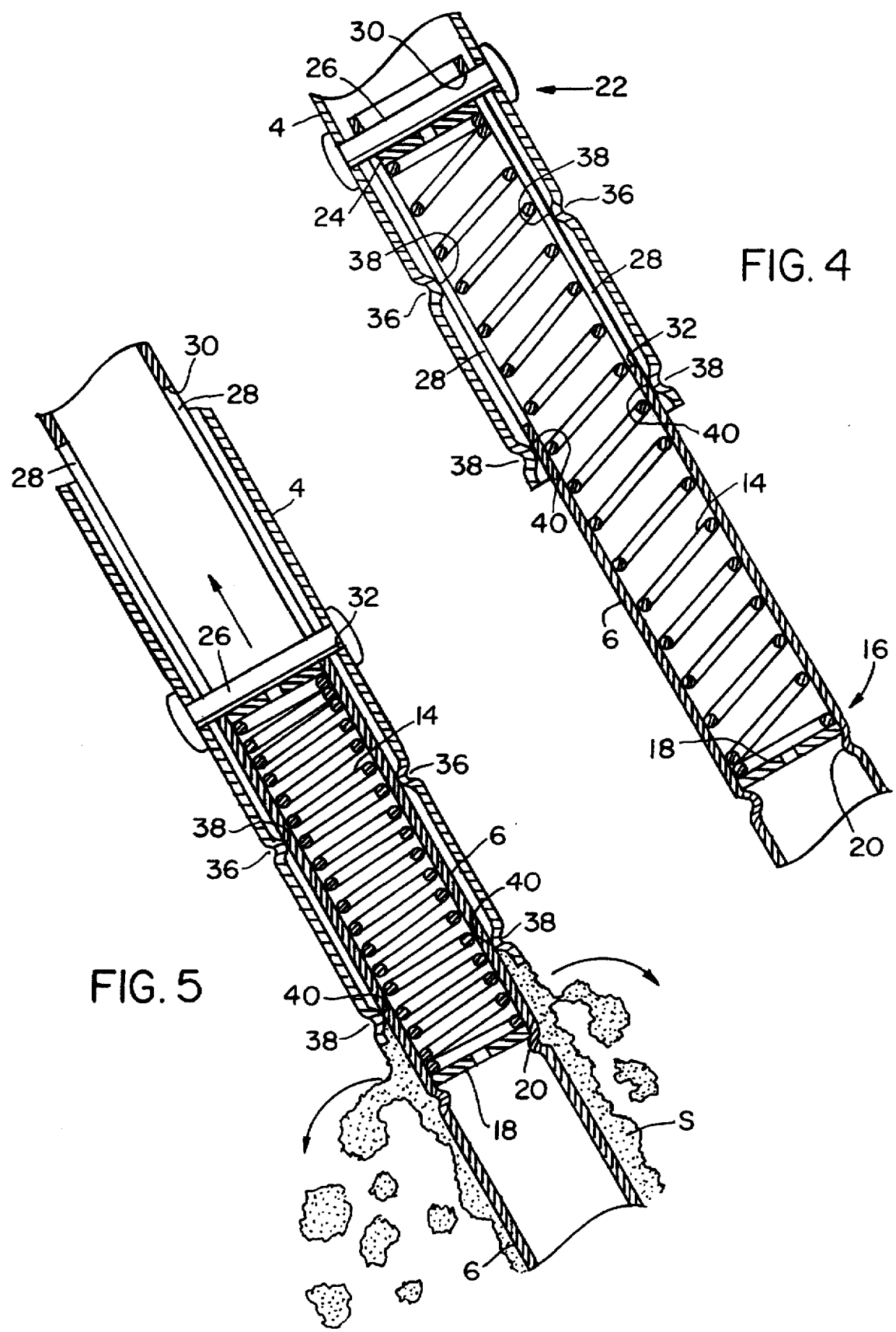

SHOCK-ABSORBING TOOL HANDLE

BACKGROUND OF THE INVENTION

This invention relates to shock-absorbing tool handles in general and, more specifically, to handles for use with shovels and the like.

U.S. Pat. No. 4,691,954 to Shaud discloses a shock-absorbing tool handle for a snow shovel. The Shaud handle has two parts or portions which telescope together and one part is joined to a detachable blade. Within the handle is a spring which compresses when the handle parts telescope together under axial load or shock imparted from the blade striking an object hidden, for example, by the snow. The compression of the spring reduces the shock impact to the user.

In the Shaud device, the handle parts are both tubular and the blade is attached to the distal part or portion in conventional fashion, the proximal portion being the end which is gripped by the user. The proximal portion is narrower in diameter than the distal portion and slides into the larger distal tube. At the intersection of the two handle portions, water, snow and other debris can flow downwardly into the larger diameter distal tube and, if allowed to collect, adds weight to the shovel, it could freeze or otherwise trap debris within the handle. With time, the spring could rest and other internal parts as well. It is, accordingly, an object of this invention to provide a shock-absorbing tool handle which is not susceptible to the collection of snow, water or other debris inside the handle.

SUMMARY OF THE INVENTION

The invention resides in a shock-absorbing tool handle comprising a tubular proximal portion and a tubular distal portion. The distal portion is formed or adapted to receive a tool such as the blade of a snow shovel or a spade. The proximal portion is larger in cross-section than the distal portion and slides over the distal portion in telescoping relationship. The handle portions telescope axially toward each other when, for example, the blade or other tool meets resistance such as a ridge in a sidewalk being shoveled or a rock or any other hard object. An internal spring is located between the handle portions and is maintained between keepers located within the respective handle portions. Guide mechanism is located in the handle portions to limit the amount of sliding motion and to permit the spring to be compressed between the keepers when axial shock is applied to the blade. The guide mechanism also serves to prevent relative rotation of the handle portions.

There is at least one annular wiper in the proximal portion surrounding the distal portion to prevent the entry of contaminants between the telescoping portions in the area of the spring and to wipe contaminants from the distal portion when the handle telescopes.

One of the spring keepers comprises a constriction in one of the handle portions supporting a washer and is illustrated as being located in the distal portion. Another spring keeper comprises a washer abutting a pin extending transversely of one of the portions herein illustrated as being the proximal portion. The guide comprises aligned slots on opposite sides of the distal portion through which the pin extends.

The above and other features of the invention including various and novel details of construction and combination of parts will now be more particularly described with reference to the accompanying drawings and pointed out in the claims. It will be understood that the particular shock-absorbing tool handle embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

FIG. 1 is a perspective view of a snow shovel embodying the present invention.

FIG. 2 is a portion of the handle of FIG. 1 at the intersection of the proximal and distal portions.

FIG. 3 is a sectional view of the spring keeper taken along the line III—III on FIG. 2.

FIG. 4 is a sectional view of the line IV—IV on FIG. 2 with the spring in the expanded condition.

FIG. 5 is a view similar to FIG. 4 with the spring in compressed position.

FIG. 6 is a sectional view similar to FIGS. 4 and 5 disclosing a second embodiment of the invention.

DETAILED DESCRIPTION OF THE INVENTION

The handle, generally designated 2, comprises a proximal portion 4 and a distal portion 6. The distal portion is adapted to receive a tool such as a snow blade 8. The tool may be a spade, pitchfork or any other equivalent tool. The handle may be of any length. The blade may be attached by any convenient means such as a pin 10. The proximal portion of the handle 4 is shown mounting an optional hand grip 12. Both portions are tubular and the proximal portion 4 is larger in cross-section than the distal portion and slidable over the distal portion in telescoping relationship. A spring 14 is contained within the handle portions and is compressible when the potions telescope toward each other. It is illustrated as being in the distal portion. A first spring keeper, best seen in FIG. 4, generally designated 16 in the distal portion of the handle, comprises a washer 18 which abuts an annular inwardly extending rib or constriction 20, formed by creating an annular indentation in the distal portion. A second spring keeper, generally designated 22, comprises a washer 24 abutting a pin 26 which passes through the proximal tubular portion 4 and is slidably received in diametrically opposed slots 28 formed in the tubular distal portion 6.

Before the spring 14 is compressed by axial force, that is, when it is moved from the FIG. 4 to the FIG. 5 position, the pin normally resides at the top 30 of the slots 28 since the spring is under a small amount of compression when assembled. However, when the distal portion 6 of the handle strikes a hard object or is otherwise compressed, it moves from the FIG. 4 to the FIG. 5 position by sliding into the proximal portion until the pin 26 abuts the bottom 32 of the slots 28.

The slots 28 serve an additional function of preventing relative rotation between the proximal and distal portions of the handle. The pin 26 is fixed in the proximal portion 4 and at all times is engagable with one or the other of the sidewalls of the slot, limiting rotation to no more than the clearance between the pin 26 and the slots 28.

Even though the proximal portion 4 of the handle is larger in diameter and telescopes over the distal portion 6 and helps to prevent the entry of snow, water and debris into the area of the opening, at least one wiper 40 is provided in the handle to affirmnatively wipe away the snow S. Whereas only one wiper is necessary, two wipers are shown. The wipers comprise annular indentations 36, 38 formed in the proximal portion 4 of the handle creating an inwardly extending bulge 40 having essentially the same (but fractionally larger) diameter as the outer diameter of the inner distal member 6. The wipers move downwardly of the distal portion with the annular bulges 40 wiping snow S and debris from the distal portion 6 as seen in FIG. 5.

FIG. 6 shows an alternative form comprising annular O-ring like members 44 retained in annular, outwardly extending, retaining recesses 46 in the proximal portion 4 of the handle. The O-rings may be made of low friction plastic material such as Delrin™ or the like. Other possible materials for the wipers could be felt, for example, secured in the proximal portion 4 and engagable with the distal portion 6 of the handle to wipe snow, rain and debris from the exposed distal portion.

We claim:

1. A shock-absorbing tool handle comprising:

a tubular proximal portion and a tubular distal portion;

the distal portion being adapted to receive a tool;

the proximal portion being larger in cross-section than the distal portion and slidable over the distal portion in telescoping relationship toward the tool;

a spring located within the handle, and compressible when the portions telescope toward each other when force is applied in an axial direction;

a first spring keeper in the distal portion and a second spring keeper in the proximal portion; and guide mechanism in the handle portions positioned to limit the sliding motion between the portions and to permit the spring to be compressed between the keepers when shock is applied to the handle.

2. Tool handle according to claim 1, wherein the first spring keeper comprises a washer abutting a constriction in the distal portion.

3. Tool handle according to claim 1, wherein the second spring keeper comprises a washer abutting a pin extending transversely of the proximal portion.

4. Tool handle according to claim 1, wherein the guide mechanism comprises a slot in the distal portion through which passes a pin fixed in and extending transversely of the proximal portion.

5. A shock-absorbing tool handle comprising:

a tubular proximal portion and a tubular distal portion;

the distal portion being adapted to receive a tool;

the proximal portion being larger in cross-section than the distal portion and slidable over the distal portion in telescoping relationship toward the tool;

a spring located within the handle, and compressible when the portions telescope toward each other when force is applied in an axial direction;

a first spring keeper in the distal portion and a second spring keeper in the proximal portion; and guide mechanism in the handle positioned to limit the sliding motion between the portions and to permit the spring to be compressed between the keepers when shock is applied to the handle to prevent relative rotation of the handle portions.

6. Tool handle according to claim 5, wherein the first spring keeper comprises a washer abutting a constriction in the distal portion.

7. Tool handle according to claim 5, wherein the second spring keeper comprises a washer abutting a pin extending transversely of the proximal portion.

8. Tool handle according to claim 5, wherein the guide mechanism comprises a slot in the distal portion through which passes a pin fixed in and extending transversely of the proximal portion.

9. A shock-absorbing tool handle comprising:

a tubular proximal portion and a tubular distal portion;

the distal portion being adapted to receive a tool;

the proximal portion being larger in cross-section than the distal portion and slidable over the distal portion in telescoping relationship toward the tool;

a spring located within the handle, and compressible when the portions telescope toward each other when force is applied in an axial direction;

a first spring keeper in the distal portion and a second spring keeper in the proximal portion; and guide mechanism in the handle positioned to limit the sliding motion between the portions and to permit the spring to be compressed between the keepers when shock is applied to the handle; and at least one wiper in the handle surrounding the distal portion and engagable with the proximal portion to prevent the entry of contaminants between the telescoping portions.

10. Tool handle according to claim 9, wherein the first spring keeper comprises a washer abutting a constriction in the distal portion.

11. Tool handle according to claim 9, wherein the second spring keeper comprises a washer abutting a pin extending transversely of the proximal portion.

12. Tool handle according to claim 9, wherein the guide mechanism comprises a slot in the distal portion through which passes a pin fixed in and extending transversely of the proximal portion.

* * * * *